(12) United States Patent
Stanbridge

(10) Patent No.: US 7,066,987 B2
(45) Date of Patent: Jun. 27, 2006

(54) SEPARATING CYCLONE AND METHOD FOR SEPARATING A MIXTURE

(75) Inventor: David Stanbridge, Arnhem (NL)

(73) Assignee: CDS Engineering B.V. (NL)

(*) Notice: Subject to any disclaimer, the term of this patent is extended or adjusted under 35 U.S.C. 154(b) by 27 days.

(21) Appl. No.: 10/772,116

(22) Filed: Feb. 3, 2004

(65) Prior Publication Data
US 2004/0177755 A1    Sep. 16, 2004

(30) Foreign Application Priority Data
Feb. 4, 2003  (NL) ................................. 1022581

(51) Int. Cl.
*B01D 45/12* (2006.01)
(52) U.S. Cl. ............................ 95/269; 55/309; 55/396; 55/457
(58) Field of Classification Search ................. 55/394, 55/396, 456, 457, 459.1, 309; 95/269
See application file for complete search history.

(56) References Cited

U.S. PATENT DOCUMENTS 3,173,771 A * 3/1965 Barrett et al. ................. 95/219
4,629,481 A * 12/1986 Echols ......................... 55/348

FOREIGN PATENT DOCUMENTS

| EP | 0 231 931    | 8/1987 |
| FR | 1 091 006    | 4/1955 |
| FR | 1 392 667    | 3/1965 |
| WO | WO 89 04726  | 6/1989 |
| WO | WO 01 00296  | 1/2001 |

OTHER PUBLICATIONS

Search Report of The Netherlands.

* cited by examiner

*Primary Examiner*—Robert A. Hopkins
(74) *Attorney, Agent, or Firm*—Ostrolenk, Faber, Gerb & Soffen, LLP

(57) ABSTRACT

A separating cyclone for at least partially separating a mixture of fluids of different density into a light fraction with a relatively low density and a heavy fraction with a relatively high density, comprising a flow body in a flow space between the flow body and casing around the flow body wherein at least one bypass channel is provided in the distal part of the flow body, via which channels a part of the mixture flowing along the flow body in the flow space can be guided. Also, a method for separating the above stated mixtures.

27 Claims, 6 Drawing Sheets

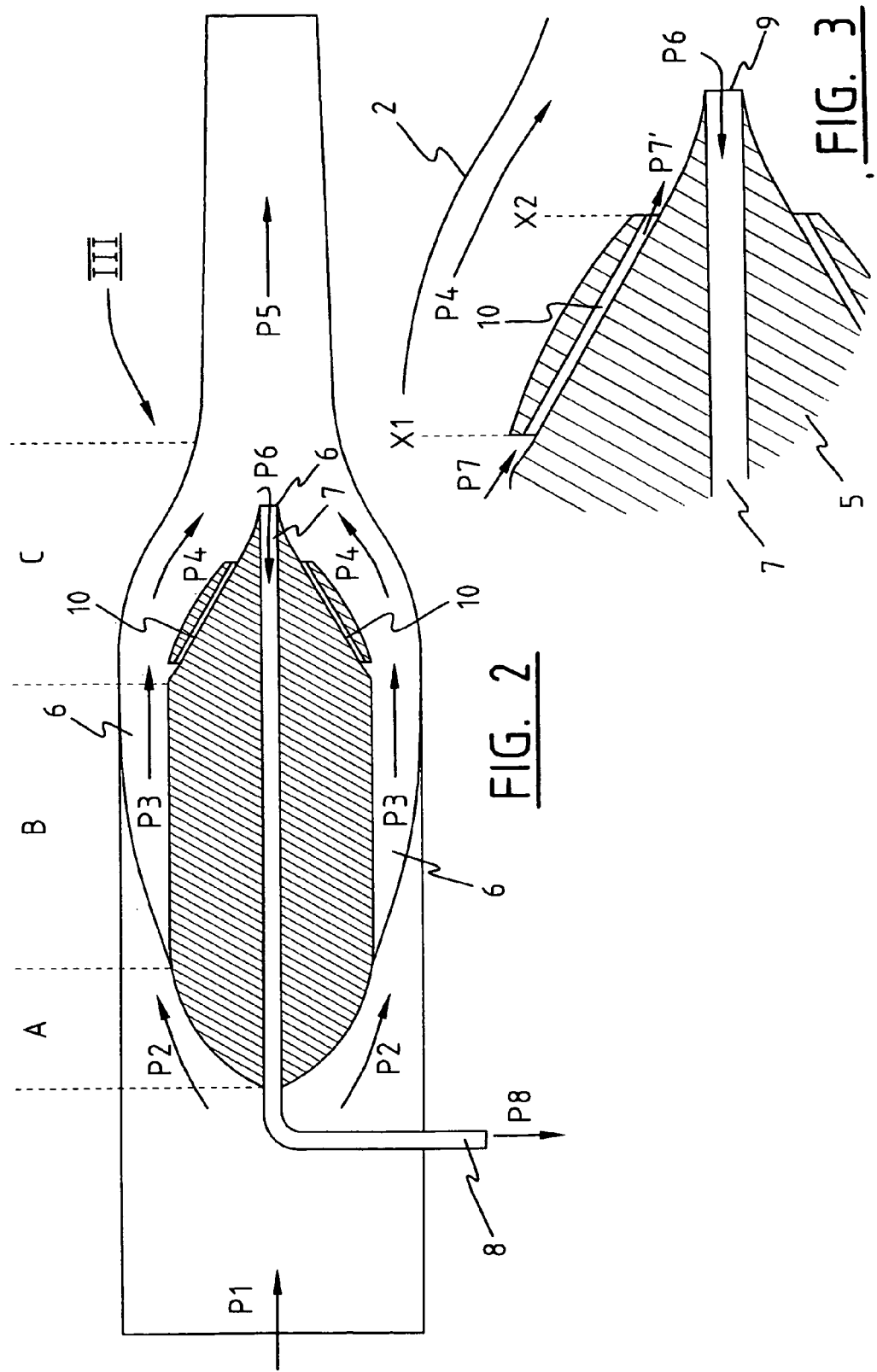

SEPARATING CYCLONE AND METHOD FOR SEPARATING A MIXTURE

BACKGROUND OF THE INVENTION

The present invention relates to a separating cyclone for at least partially separating a mixture of fluids of different density into a light fraction with a relatively low density and a heavy fraction with a relatively high density. The invention also relates to a flow body for such a separating cyclone and to a method for at least partially separating said mixture.

Known for the purpose of separating mixtures of mutually insoluble liquids, such as oil and water, are separating cyclones wherein use is made of the difference in density between water and oil to bring about the separation. The mixture for separating is set into rotation in a tube, whereby under the influence of the occurring centrifugal forces the relatively heavy water is flung against the wall of the tube and the relatively light oil moves to the centre of the tube. The oil and the water are hereby separated from each other spatially, which provides the option of discharging the oil and the water separately.

Such a separating cyclone is described in the international publication WO 89/04726. Herein a mixture of oil and water is fed axially into the cyclone and set into rotation using a number of swirl blades arranged on a flow body. Downstream of the blades the diameter of the cyclone decreases in order to increase the rotation as a result of angular momentum being sustained. In the cyclone a mixture part with a relatively large amount of light oil accumulates in a core in the centre of the cyclone, and this core is removed via an overflow outlet and a channel through the flow body in a direction opposite the direction of flow of the supplied mixture. The mixture part with a relatively large amount of the heavy water follows a path through the cyclone and is discharged further along via an underflow outlet.

A quite reasonable separating efficiency can be achieved with the known separating cyclones. The separating efficiency is however limited in that a part of the mixture flowing along the flow body and set into rotation detaches from the surface of the flow body.

SUMMARY OF THE INVENTION

It is an object of the present invention to being about a separation of the mixture where the above stated drawback is wholly or at least partially obviated. It is a further object of the invention to provide a separating cyclone with improved properties. This is understood to mean a cyclone with a higher separating efficiency at a given composition and pressure of the mixture for admitting and/or, at a given pressure drop, a higher throughput with a substantially constant separating efficiency. This can also be understood to mean that at a determined throughput the pressure drop over the cyclone is lower.

According to a first aspect of the present invention there is provided for this purpose a separating cyclone for at least partially separating a mixture of fluids of different density into a light fraction with a relatively low density and a heavy fraction with a relatively high density, comprising:

an outer casing which defines a flow space through which the mixture is to flow;

inlet means connected distally to the outer casing for admitting the mixture for separating into the flow space, a flow body disposed in the flow space wherein the mixture can be guided between the flow body and outer casing and wherein the distal part of the flow body has a decreasing diameter;

rotating means for setting into rotation the mixture for separating;

first outlet means connected proximally to the outer casing for discharging the heavy fraction from the flow space;

second outlet means disposed in the flow space for discharging the light fraction from the flow space, wherein one or more bypass channels are provided in said distal part of the flow body, via which channels a part of the mixture flowing along the flow body can be guided.

According to a preferred embodiment, a bypass channel extends from a position (x1), at which the flow body has a relatively large diameter, to a position (x2) at which the flow body has a relatively small diameter.

According to a further preferred embodiment, the cyclone comprises a bypass channel which, in cross-section through the flow body, is practically annular. This means that the bypass flow leaves the bypass channel distributed uniformly over the periphery of the flow body.

According to a further preferred embodiment, a bypass channel is embodied coaxially with the flow body, so that the mixture enters the bypass channel in uniformly distributed manner.

At the position of the distal part of the flow body, the tangential speed of the mixture increases because the angular momentum is sustained. Too low an axial speed can result in an uncontrollable separation of the flow on the inner surface of the outer casing. Too high an axial speed can prevent a so-called "vortex-breakdown", which is necessary for the separating process. It has been found that when the distal part of the flow body has a conical form, a relatively high separating efficiency can be achieved.

A further preferred embodiment relates to a tangential separating cyclone. In a tangential separating cyclone the inlet means comprise an inlet part extending tangentially relative to the flow space and debauching in the flow space. The mixture is thus supplied tangentially. The inner side of the outer casing is then preferably formed such that it sets the admitted mixture into rotation. When the outer casing takes the form of an axially extending surface of revolution, such as when the outer casing is for instance of cylindrical form, the inner side of the outer casing ensures that the mixture is set into rotation.

Another preferred embodiment relates to an axial separating cyclone. In an axial separating cyclone the inlet means comprise an inlet part extending axially relative to the outer casing and debauching in the flow space. In such an axial cyclone it is possible to substantially reduce the pressure drop for a given flow rate.

In an axial cyclone the mixture is preferably set into rotation by rotating means positioned between the flow body and the outer casing. In a further preferred embodiment the rotating-means are formed by one or more swirl blades which are placed in stationary manner between the outer casing and the flow body and which have a curvature such that they impart a correct degree of rotation to a mixture flowing therealong.

In order to bring about a further increase in the tangential speed of the mixture, the outer casing has in a further preferred embodiment a decreasing diameter at the position of the distal part of the flow body. The diameter of the flow body is herein adapted to that of the outer casing, this such that a substantially constant flow surface is created for the fluid when this fluid flows through this part of the cyclone. The pressure drop is hereby reduced.

The first outlet means preferably comprise a discharge pipe extending coaxially with the flow space, so that the heavy phase can be discharged with a minimum pressure drop.

The second outlet means preferably comprise a discharge channel extending through the flow body, the inlet opening of which channel is positioned at the distal end of the flow body. This provides an efficient discharge of the light fraction.

According to another aspect of the invention, a flow body is provided for application in the above described separating cyclone.

According to another aspect of the invention, there is provided a method for at least partially separating a mixture of fluids of different density into a light fraction with a relatively low density and a heavy fraction with a relatively high density, comprising of:

feeding the mixture for separating into a flow space defined by an outer casing;
setting the admitted mixture into rotation;
guiding the mixture, once set into rotation, along a flow body disposed in the flow space;
discharging the heavy fraction via a first outlet means connected proximally to the outer casing;
discharging the light fraction from the flow space via second outlet means disposed in the flow space;
guiding a part of the mixture flowing along the flow body through one or more bypass channels arranged in the flow body.

Further advantages, features and details of the present invention are elucidated on the basis of the description of a number of preferred embodiments thereof. Reference is made in the description to the following figures.

BRIEF DESCRIPTION OF THE DRAWINGS

FIG. 2 shows a longitudinal section of the embodiment depicted in FIG. 1;

FIG. 3 shows a more detailed longitudinal section at the position of section C of the flow body according to FIG. 2;

DESCRIPTION OF PREFERRED EMBODIMENTS

Figure 1:
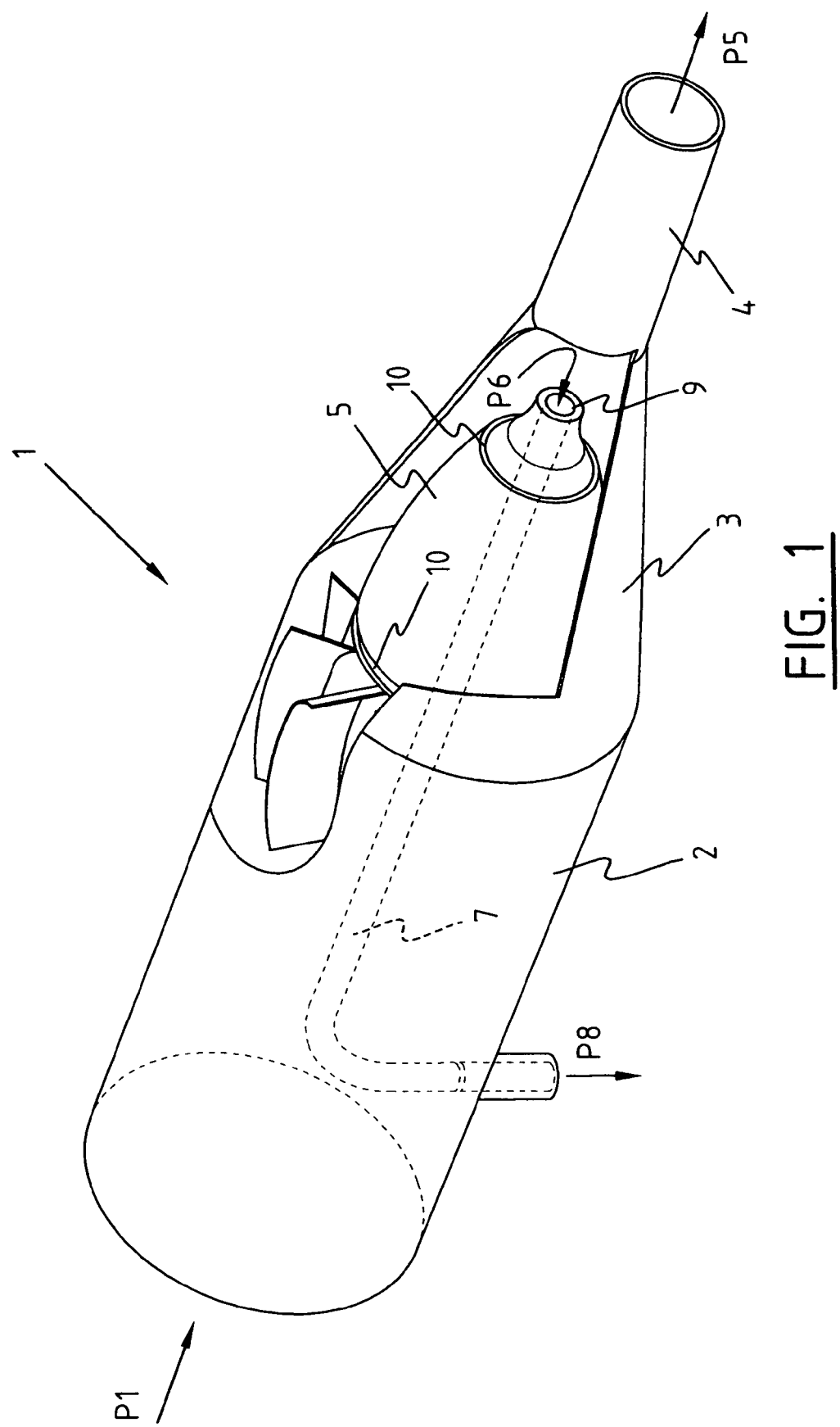
FIG. 1 shows a partly cut-away perspective view of an axial separating cyclone according to a first preferred embodiment of the invention.

Referring to FIGS. 1–3, a first preferred embodiment of a cyclone separator is shown. A mixture is supplied of two or more liquids of different density. A relatively heavy liquid (also referred to hereinbelow as the heavy fraction), such as water, is mixed with a relatively light liquid, such as oil. It is however equally possible to separate a mixture of gases or a gas/liquid mixture.

Separating cyclone 1 has for its object to separate the supplied mixture into a part containing substantially the heavy liquid (also referred to hereinbelow as the heavy fraction), and a part containing substantially the light liquid (also referred to as the light fraction). Separating cyclone 1 is constructed from a cylindrical outer casing, inside which a flow space is defined. The outer casing comprises an initial pipe 2 which has a substantially constant diameter, a middle pipe 3, the diameter of which decreases in axial direction, and a cylindrical end pipe 4.

A flow body is arranged in the space enclosed by initial pipe 2. In the shown embodiment the flow body takes an axially symmetrical form. This is not essential however. Swirl elements 6 are arranged between flow body 5 and the inside of initial pipe 2. Swirl elements 6 have the function of setting into rotation the mixture flowing therealong.

Swirl elements 6 are fixed to the outside of flow body 5 and/or on the inside of initial pipe 2. At the distal end of flow body 5 there is provided an entrance opening 9 which provides access to a discharge channel 7 extending through the interior of the flow body. Discharge channel 7 is connected to a further discharge channel 8. Discharge channel 8 extends through the casing of initial pipe 2. Discharge channels 7 and 8 have the function of discharging the separated light fraction.

During use a mixture of a light and heavy fraction enters the separating cyclone 1 (arrow $P_1$) and is then guided along the proximal part (section A) of flow body 5 (arrow $P_2$). Section A of the flow body is formed such that the incoming flow is guided to a subsequent section (section B) uniformly and with substantially homogeneous acceleration.

Section B contains swirl elements 6 which have the function of setting into rotation the mixture flowing therealong and thus imparting a tangential component of velocity to the mixture. For this purpose swirl elements 6 comprise a number of swirl blades which are formed such that the mixture attains maximum tangential speed without the mixture herein releasing from the surface of the blades themselves.

After the supplied mixture has also obtained, in addition to an axial speed, a tangential component of velocity in section B, the mixture comes to lie in a further section C (arrow $P_4$). In the shown embodiment flow body 5 is formed such that the diameter of flow body 5 decreases in axial direction to the distal end of the cyclone. In the shown embodiment the distal part of the flow body has a conical form. It has been found that this form is particularly suitable for enabling a good separation of the fractions to be made. In the shown embodiment the diameter of the inner wall of middle pipe 3 also decreases.

In section 3 the diameter of the cyclone therefore decreases with the purpose of increasing the rotation of the mixture through sustaining of the angular momentum. In other words, the tangential speed of the mixture increases further in this section.

As a result of the relatively high tangential speeds of the mixture, the relatively heavy part of the mixture will be flung outward as a result of centrifugal forces and be flung substantially to a region close to the inner side of pipe 3, while the relatively light part of the mixture will remain close to the core of pipe 3.

The heavy fraction is then discharged via end pipe 4 in the direction of arrow $P_5$, while the relatively light fraction can be forced into discharge pipe 7 via entrance opening 9 (arrow $P_6$) and can then be discharged via discharge pipe 8 (arrow $P_8$).

For the further operation of such a per se known axial separating cyclone reference is made to the international patent publication WO 89/04726. An axial separating cyclone of the above described type is set forth therein.

It has however been found in practice that in such axial separating cyclones of the conventional type there is such a flow profile generated that relatively low speeds and high pressure can occur in a determined region (region S in FIG. 6) at the position of section C. The cause of this is the specific geometry of the cyclone (increase/decrease of flow surface) in combination with a rotating flow. The danger of such local relatively low speeds and relatively high pressures is that so-called boundary-layer separation can occur. This means that the as yet smooth flow profile at the wall is seriously disrupted, whereby even return flow can occur. The rotating flow which is responsible for the separation at the position of the release is hereby destroyed.

This means that the separating action in a conventional cyclone takes place mainly on the outside of the cyclone, which has a negative influence on the separating action of the cyclone.

Figure 6:
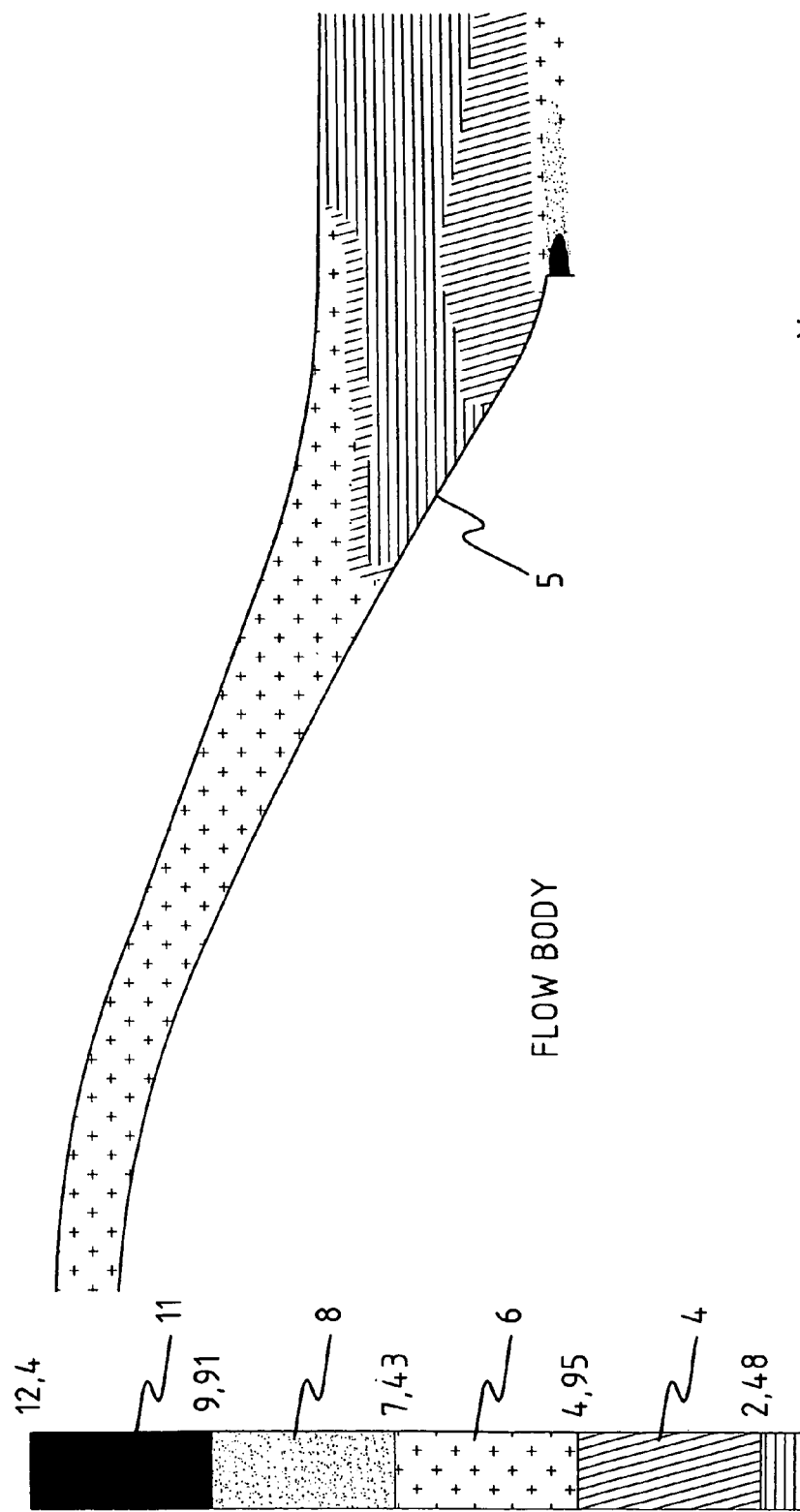
FIG. 6 shows the tangential speed of the mixture at the position of section C when a conventional flow body is applied.

More insight into this effect is given in FIG. 6, in which the tangential speed of a mixture flowing along section C of a flow body 5 is shown as a function of the axial distance x. It can be clearly seen that in the region designated S the tangential speed greatly decreases, which indicates that in this region the flow as it were releases from the surface of the flow body. As set forth above, this has a negative effect on the separating efficiency of the cyclone.

In order to increase the separating efficiency, flow body 5 is embodied in the shown embodiment such that a bypass channel 10 is arranged at the position of section C. A small part of the mixture flowing along the outer surface of flow body 5 flows in this case into the channel 10 at a first position $x_1$ (arrow ($P_7$) and leaves channel 10 at a further position $x_2$ (arrow $P_7'$). The position $x_2$ is herein chosen such that it is situated in axial direction close to the above stated region S. For an optimal effect the position $x_2$ is positioned in axial direction beyond the region S. The mixture flowing through bypass channel 10 then functions as a "slipstream" which prevents the above stated separation of the flow along the outer surface of the flow body from taking place. This is further explained in FIG. 7, in which the tangential speeds are shown as function of the axial distance when a flow body according to the invention is applied.

As a result of the flow through the bypass channel, the local speed of the mixture will be higher at the position of $x_2$ than in the conventional case. As a result hereof the local pressure is lower, which helps to prevent boundary layer separation. The effect hereof is that a more effective separation takes place over the whole cross-section of the cyclone.

Figure 7:
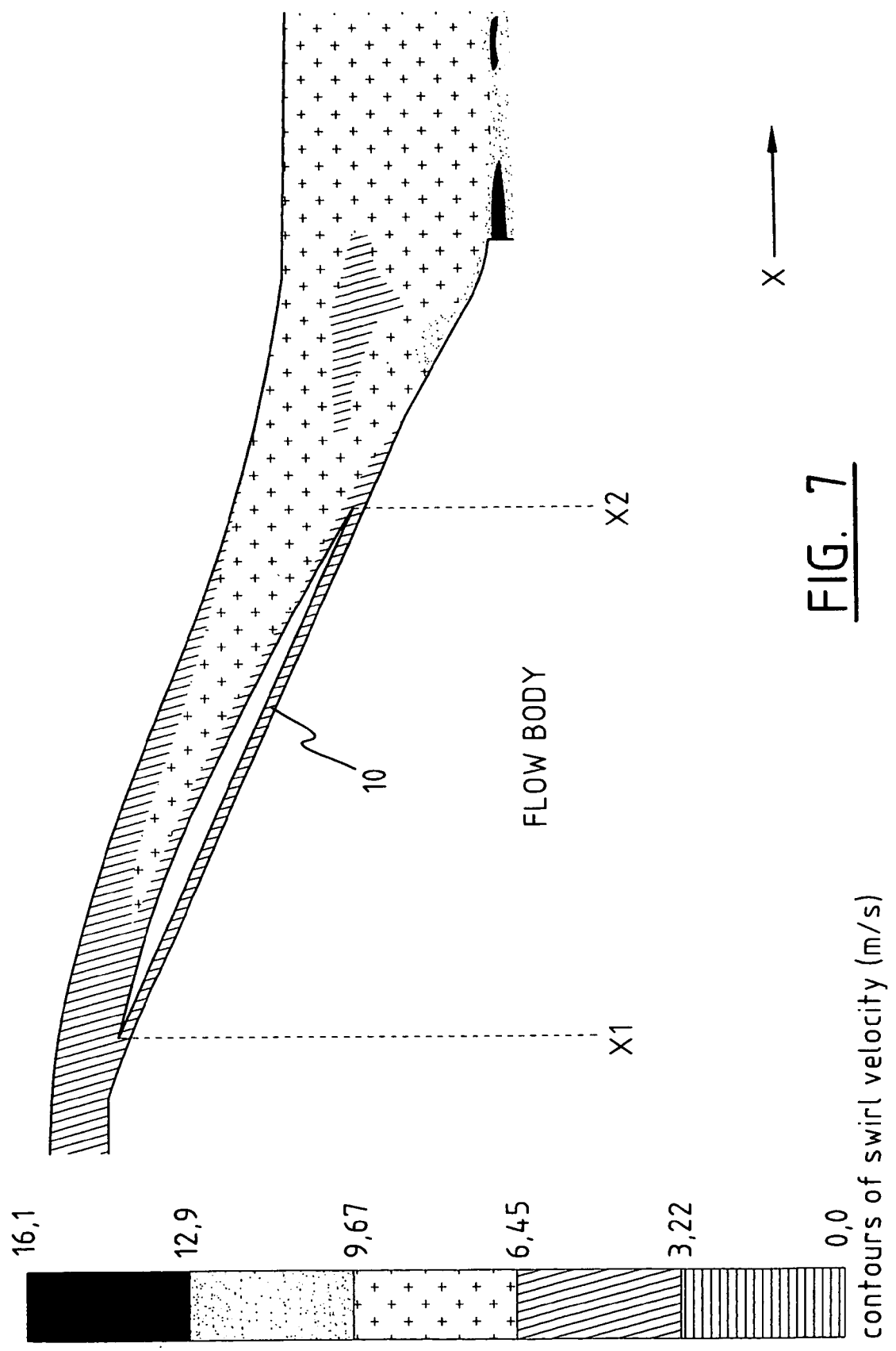
FIG. 7 shows the tangential speed of the mixture at the position of section C when a flow body according to the preferred embodiment of FIG. 1 is applied.

This is shown clearly in FIG. 7. The tangential speeds are distributed more uniformly over the region between the inner side of pipe 3 and the outer side of flow body 5. This means that the mixture flowing along the outer side of flow body 5 is not likely to, or at least is less likely to detach from this outer surface. This in turn results once again in a greater separating efficiency.

In the embodiment shown in FIGS. 1–3 the bypass channel has a substantially annular form in cross-section, wherein the diameter of the ring decreases axially in the direction of end pipe 4. This form is recommended since it causes a uniformly distributed slipstream. Other embodiments of the bypass channel can however also be envisaged. It is thus possible for instance to provide two or more bypass channels or to select the starting position $x_1$ of the channel further upstream, for instance at the position of section B or further.

Figure 4:
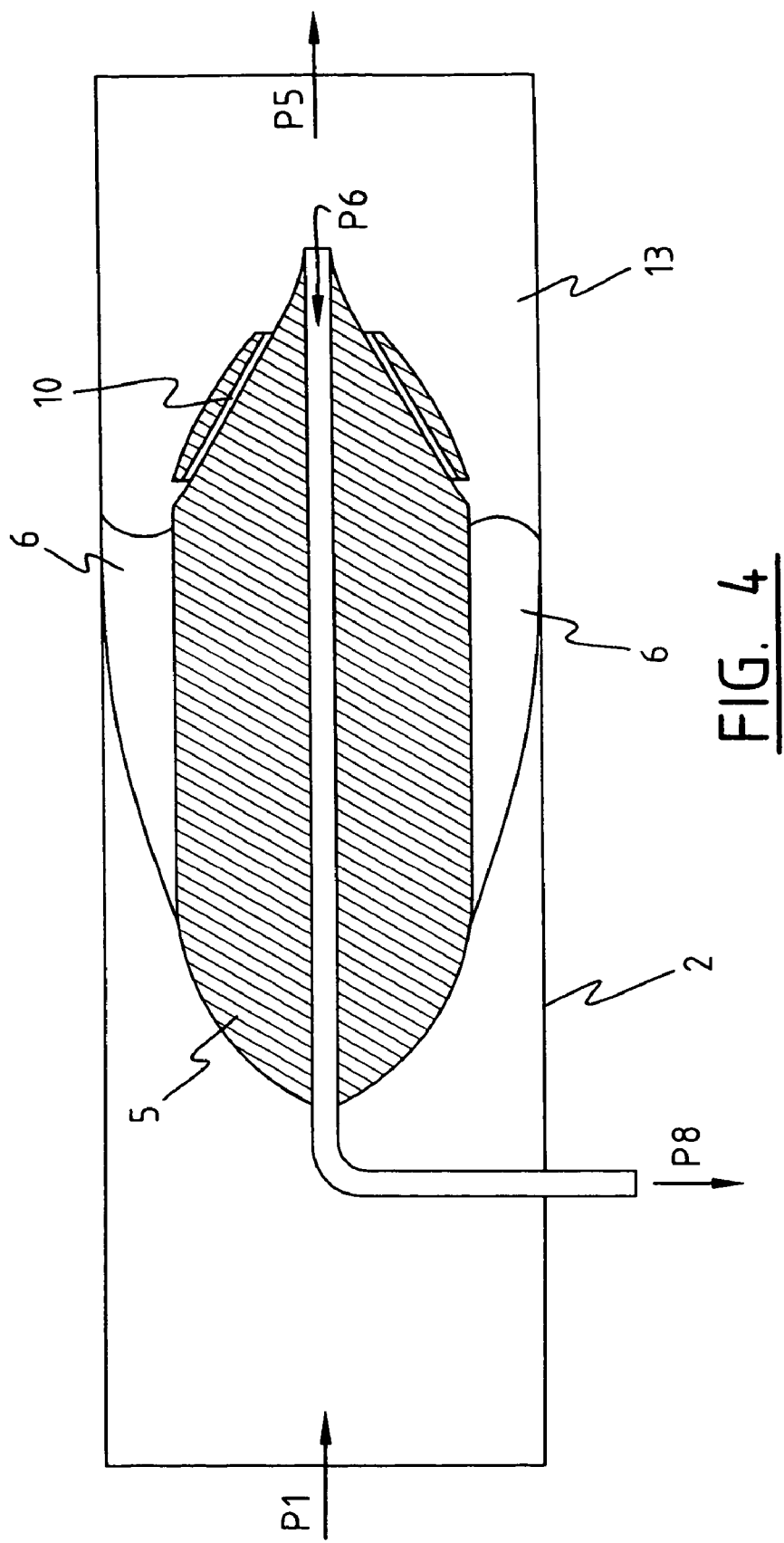
FIG. 4 shows a longitudinal section of a second preferred embodiment of an axial separating cyclone according to the invention.

FIG. 4 shows a second preferred embodiment of separating cyclone 1. The construction of this cyclone largely corresponds with that of the cyclone shown in FIGS. 1–3. Corresponding components thereof are therefore designated with the same reference numerals. In this embodiment the conical pipe part 3 is replaced by a substantially cylindrical pipe 13. It is also possible to manufacture pipes 2 and 13 integrally. Although in the embodiment of FIGS. 1–3 the pipe part 13 decreases in diameter at the position of section C, whereby the tangential speed of the mixture flowing there is increased, a reasonably good separation can also be obtained in the present embodiment where the diameter of pipe 13 remains constant. The advantage of the present invention is that it is simpler to manufacture.

Figure 5:
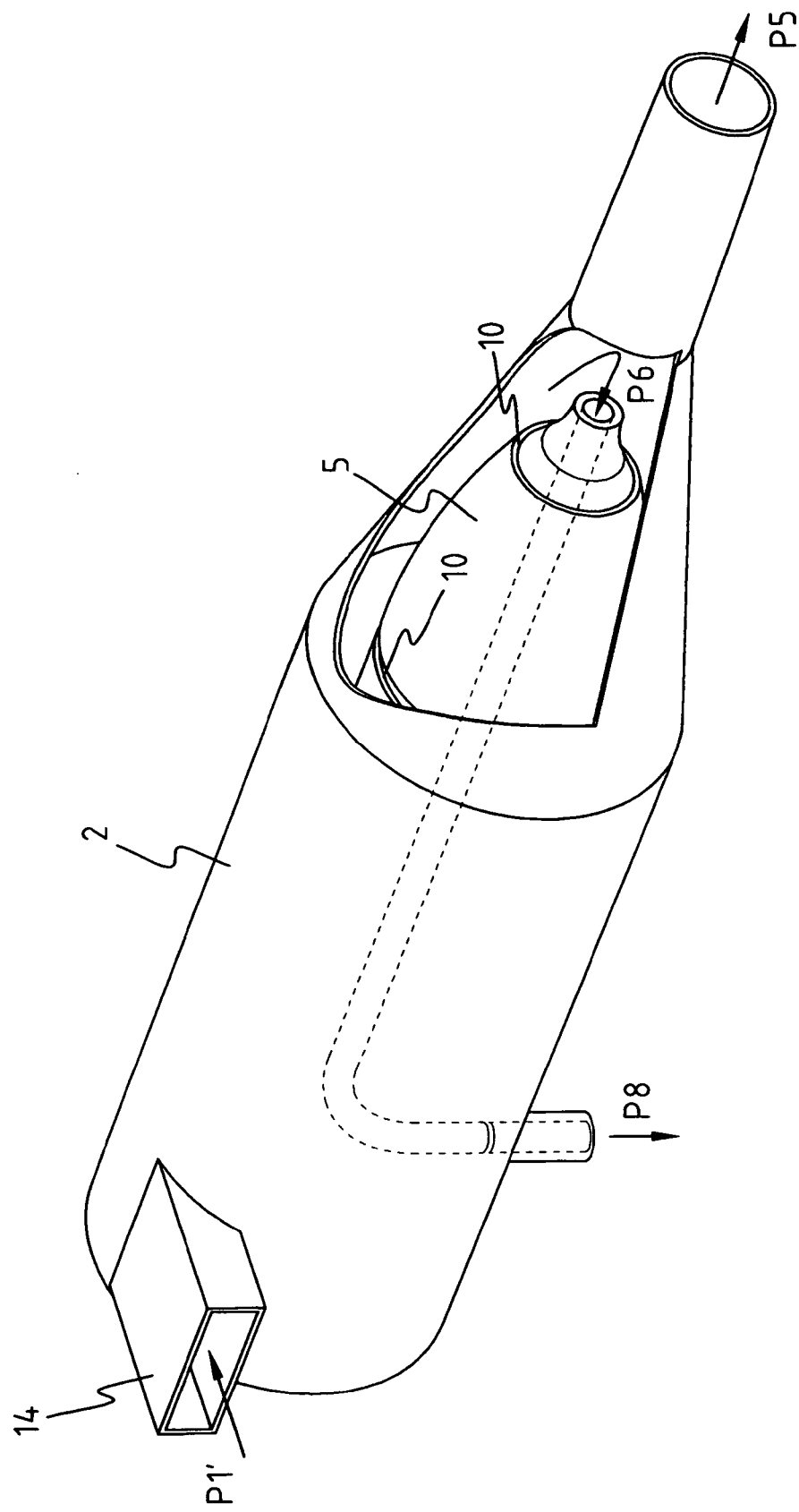
FIG. 5 shows a partly cut-away perspective view of a preferred embodiment of a tangential cyclone according to the invention.

FIG. 5 shows a further preferred embodiment of a separating cyclone in which the mixture for separating is supplied not in axial direction but in tangential direction. For this purpose the cyclone is provided with a tangential inlet 14, via which the mixture enters the cyclone (arrow $P'_1$). The mixture is set into a rotating movement by the curved form of the inner surface of initial pipe 2. In this embodiment the above stated rotating means between pipe 2 and flow body 5 can therefore be omitted. The embodiment of this tangential inlet cyclone otherwise corresponds with that of one of the above stated embodiments.

In FIG. 5 pipe 3 takes a conical form at the position of section C, analogously to the embodiment shown in FIGS. 1–3. An embodiment with a straight pipe 13, this in accordance with the embodiment of FIG. 4, can however also be envisaged.

The present invention is not limited to the above described preferred embodiments thereof. The rights sought are defined by the following claims, within the scope of which many modifications can be envisaged.

The invention claimed is:

1. Separating cyclone for at least partially separating a mixture of fluids of different density into a light fraction with a relatively low density and a heavy fraction with a relatively high density, comprising:
    an outer casing which defines a flow space through which the mixture is to flow;
    an inlet connected distally to the outer casing for admitting the mixture for separating into the flow space,
    a flow body disposed in the flow space wherein the mixture can be guided in a flow direction through the flow space and between the flow body and the outer casing and wherein the flow body has a distal part of decreasing diameter in the flow direction;
    a rotator device in the flow space for setting into rotation the mixture for separating;
    a first outlet connected proximally to the outer casing for discharging the heavy fraction from the flow space;
    a second outlet disposed in the flow space for discharging the light fraction from the flow space, and
    at least one bypass channel at the distal part of the flow body, each bypass channel being shaped and positioned for guiding a part of the mixture flowing along the flow body in the flow direction.

2. Separating cyclone as claimed in claim 1, wherein the flow body of decreasing diameter has a larger diameter and decreases in diameter to a smaller diameter, and the at least one bypass channel extends from a first position, at which the flow body has a relatively larger diameter, to a second position at which the flow body has a relatively smaller diameter.

3. Separating cyclone as claimed in claim 1, wherein the at least one bypass channel is substantially annular in a cross-section through the flow body.

4. Separating cyclone as claimed in claim 1, wherein the at least one bypass channel is embodied coaxially with the flow body.

5. Separating cyclone as claimed in claim 1, wherein the distal part of the flow body has a conical form.

6. Separating cyclone as claimed in claim 1, wherein the inlet comprises an inlet part extending axially relative to the outer casing and debouching in the flow space.

7. Separating cyclone as claimed in claim 1, wherein the inlet comprises an inlet part extending tangentially relative to the flow space and debouching in the flow space.

8. Separating cyclone as claimed in claim 1, wherein the rotator device comprises at least one swirl blade shaped and oriented for causing the mixture to swirl as it flows.

9. Separating cyclone as claimed in claim 8, wherein the rotator device is fixed to at least one of the flow body and the outer casing.

10. Separating cyclone as claimed in claim 1, wherein the outer casing has an inner side and the rotator device is formed by the inner side of the outer casing.

11. Separating cyclone as claimed in claim 10, wherein the outer casing has the form of an axially extending surface of revolution.

12. Separating cyclone as claimed in claim 10, wherein the inner side of the outer casing has a substantially cylindrical form.

13. Separating cyclone as claimed in claim 1, wherein the outer casing has a decreasing diameter at the position of the distal part of the flow body.

14. Separating cyclone as claimed in claim 13, wherein the diameter of the outer casing is adapted to the diameter of the flow body such that an almost constant flow surface is provided.

15. Separating cyclone as claimed in claim 1, wherein the first outlet comprise a discharge pipe extending coaxially with the flow space.

16. Separating cyclone as claimed in claim 15, wherein the second outlet comprises a discharge channel extending through the flow body, the discharge channel has an inlet opening which is positioned at the distal end of the flow body.

17. Separating cyclone as claimed in claim 1, wherein the heavy fraction substantially comprises water and the light fraction substantially comprises oil.

18. Separating cyclone as claimed in claim 1, wherein the second outlet comprises a discharge channel extending through the flow body, the discharge channel has an inlet opening which is positioned at the distal end of the flow body.

19. Flow body for placement into a separating cyclone for at least partially separating a mixture of fluids of different density into a light fraction with a relatively low density and a heavy fraction with a relatively high density, wherein the flow body comprises a proximal part on which a rotating device is arranged for setting into rotation the mixture flowing along the body, and also comprises a distal part of decreasing diameter in a flow direction of the mixture, at least one bypass channel at the distal part via which a part of the fluid flowing along the flow body can be guided.

20. Flow body as claimed in claim 19, wherein the flow body of decreasing diameter has a larger diameter and decreases in diameter to a smaller diameter, and the at least one bypass channel extends from a first position, at which the flow body has a relatively larger diameter, to a second position at which the flow body has a relatively smaller diameter.

21. Flow body as claimed in claim 19, wherein the at least one bypass channel is substantially annular in a cross-section through the flow body.

22. Flow body as claimed claim 19, wherein the at least one bypass channel is embodied co-axially with the flow body.

23. Flow body as claimed in claim 19, wherein the distal part of the flow body has a conical form.

24. Method for at least partially separating a mixture of fluids of different density into a light fraction with a relatively low density and a heavy fraction with a relatively high density, comprising:
   feeding the mixture for separating into a flow space defined by and between an outer casing and a flow body disposed in the casing;
   setting the mixture into rotation in the flow space;
   guiding the mixture, once set into rotation, along the flow body disposed in the flow space;
   discharging the heavy fraction via a first outlet connected proximally to the outer casing;
   discharging the light fraction from the flow space via a second outlet disposed in the flow space, and
   guiding a part of the mixture flowing along the flow body through at least one bypass channel arranged in the flow body at a distal part of the flow body.

25. Method as claimed in claim 24, comprising axially supplying the mixture for separating and, using swirl blades arranged between the outer casing and the flow body for setting into rotation the mixture flowing therealong.

26. Method as claimed in claim 24, comprising tangentially supplying the mixture for separating and, using the outer casing, setting into rotation the mixture flowing therealong.

27. Method as claimed in claim 24, wherein the heavy fraction substantially comprises water and the light fraction substantially comprises oil.

* * * * *